US010705983B1

United States Patent
Tzortzatos et al.

(10) Patent No.: US 10,705,983 B1
(45) Date of Patent: Jul. 7, 2020

(54) TRANSPARENT CONVERSION OF COMMON VIRTUAL STORAGE

(71) Applicant: International Business Machines Corporation, Armonk, NY (US)

(72) Inventors: Elpida Tzortzatos, Lagrangeville, NY (US); Michael Gary Spiegel, Monroe, NY (US); Karl David Schmitz, Poughkeepsie, NY (US); Steven Partlow, Beacon, NY (US); Harris M. Morgenstern, Wappingers Falls, NY (US); David Hom, Poughkeepsie, NY (US); Peter Fatzinger, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/290,241

(22) Filed: Mar. 1, 2019

(51) Int. Cl.
*G06F 12/10* (2016.01)
*G06F 12/14* (2006.01)

(52) U.S. Cl.
CPC ........ *G06F 12/1458* (2013.01); *G06F 12/10* (2013.01); *G06F 2212/1052* (2013.01); *G06F 2212/657* (2013.01)

(58) Field of Classification Search
CPC .. G06F 12/1458; G06F 12/10; G06F 12/1052; G06F 2212/657
See application file for complete search history.

(56) References Cited

U.S. PATENT DOCUMENTS

| 6,622,229 | B2 * | 9/2003 | Morgenstern | ......... G06F 12/109 711/203 |
| 7,908,646 | B1 | 3/2011 | Chen et al. | |
| 9,715,410 | B2 | 7/2017 | Bonzini et al. | |
| 9,971,707 | B2 | 5/2018 | Jaeger | |
| 10,002,084 | B1 | 6/2018 | Warkentin et al. | |

(Continued)

OTHER PUBLICATIONS

J. Y. Hur, "Representing Contiguity in Page Table for Memory Management Units," 2017 IEEE 11th International Symposium on Embedded Multicore/Many-core Systems-on-Chip (MCSoC), Seoul, 2017, pp. 21-28. (Year: 2017).*

(Continued)

*Primary Examiner* — Khoa D Doan
(74) *Attorney, Agent, or Firm* — Cantor Colburn LLP; Teddi Maranzano (57) ABSTRACT

Embodiments are provided for implementing a transparent conversion of common virtual storage requests to storage with limited access. Embodiments include providing a storage manager configured to perform address translation for requests, providing a data address translation (DAT) structure configured to connect a higher-level DAT table to a lower-level DAT table, and creating the DAT structure based on a request from a process. Embodiments also include responsive to receiving a storage request, performing a DAT fault process based on validating user credentials associated with an entry of the higher-level DAT table corresponding to the storage request, and responsive to the validation, updating the higher-level DAT table entry to allow access to the restricted-use portion of the common virtual storage, and otherwise, returning a DAT fault for the higher-level DAT table entry.

20 Claims, 10 Drawing Sheets

(56) References Cited

U.S. PATENT DOCUMENTS

| | | | |
|---|---|---|---|
| 2004/0215919 A1* | 10/2004 | Emmes | G06F 12/1009 |
| | | | 711/208 |
| 2006/0036830 A1 | 2/2006 | Dinechin et al. | |
| 2008/0313502 A1* | 12/2008 | Mcfadden | G06F 11/3636 |
| | | | 714/45 |
| 2013/0198857 A1* | 8/2013 | Maier | G06F 21/60 |
| | | | 726/27 |
| 2014/0108701 A1 | 4/2014 | Liljeberg | |
| 2015/0067775 A1* | 3/2015 | Cardone | H04L 63/0884 |
| | | | 726/3 |
| 2017/0109290 A1* | 4/2017 | Albot | G06F 12/1009 |
| 2017/0123690 A1* | 5/2017 | Albot | G06F 9/38 |
| 2018/0095690 A1* | 4/2018 | Gates | G06F 16/188 |
| 2018/0095892 A1 | 4/2018 | Wilkinson et al. | |

OTHER PUBLICATIONS

Subashini, S., & Kavitha, V. (2011). A survey on security issues in service delivery models of cloud computing. Journal of network and computer applications, 34(1), pp. 1-11.

* cited by examiner

FIG. 10

TRANSPARENT CONVERSION OF COMMON VIRTUAL STORAGE

BACKGROUND

The present invention generally relates to storage management, and more specifically, to transparent conversion of common virtual storage to restricted shared memory area to select address spaces.

The sharing of storage is an important aspect of many computer systems. Specifically, the ability to selectively control the data areas that are accessible to the units of work within the system is an essential function of an operating system. One function of the operating system allows a user to share pages of storage between address spaces and/or data spaces of the system. There may be a need to efficiently manage the address spaces and accessibility of the shared pages of storage.

SUMMARY

Embodiments of the present invention are directed to a computer-implemented method for implementing a transparent conversion of common virtual storage requests to storage with limited access. A non-limiting example of the computer-implemented method includes providing a storage manager configured to perform address translation for requests, and providing a data address translation (DAT) structure configured to connect a higher-level DAT table to a lower-level DAT table, wherein the higher-level DAT table is initially disconnected from a lower-level DAT table associated with a common virtual storage. The computer-implemented method includes creating, by a storage manager, the DAT structure based on a request from a process, wherein the DAT structure comprises a reference to one or more higher-level DAT tables, lower-level DAT table tables, and data page tables, and marking entries of the higher-level DAT as disconnected from the common virtual storage and invalid for address spaces corresponding to a restricted-use portion of the common virtual storage. The computer-implemented method includes responsive to receiving a storage request, performing a DAT fault process based on validating user credentials associated with an entry of the higher-level DAT table corresponding to the storage request, and responsive to the validation, updating the higher-level DAT table entry to allow access to the restricted-use portion of the common virtual storage, otherwise, returning a DAT fault for the higher-level DAT table entry.

Embodiments of the present invention are directed to a system for implementing a transparent conversion of common virtual storage requests to storage with limited access. A non-limiting example of the system includes a storage medium, the storage medium being coupled to a processor. The processor is configured to provide a data address translation (DAT) structure configured to connect a higher-level DAT table to a lower-level DAT table, wherein the higher-level DAT table is initially disconnected from a lower-level DAT table associated with a common virtual storage, and create the DAT structure based on a request from a process, wherein the DAT structure comprises a reference to one or more higher-level DAT tables, lower-level DAT tables, and data page tables. The processor is also configured to mark entries of the higher-level DAT table as disconnected from the common virtual storage and invalid for address spaces corresponding to a restricted-use portion of the common virtual storage, and responsive to receiving a storage request, perform a DAT fault process based on validating user credentials associated with an entry of the higher-level DAT table corresponding to the storage request. The processor is also configured to responsive to the validation, update the higher-level DAT table entry to allow access to the restricted-use portion of the common virtual storage, otherwise, return a DAT fault for the higher-level DAT table entry.

Embodiments of the invention are directed to a computer program product for implementing a transparent conversion of common virtual storage requests to storage with limited access, the computer program product comprising a computer-readable storage medium having program instructions embodied therewith. The program instructions are executable by a processor to cause the processor to perform a method. A non-limiting example of the method includes providing a storage manager configured to perform address translation for requests, and providing a data address translation (DAT) structure configured to connect a higher-level DAT table to a lower-level DAT table, wherein the higher-level DAT table is initially disconnected from a lower-level DAT table associated with a common virtual storage. The method includes creating, by a storage manager, the DAT structure based on a request from a process, wherein the DAT structure comprises a reference to one or more higher-level DAT tables, lower-level DAT table tables, and data page tables, and marking entries of the higher-level DAT as disconnected from the common virtual storage and invalid for address spaces corresponding to a restricted-use portion of the common virtual storage. The method includes responsive to receiving a storage request, performing a DAT fault process based on validating user credentials associated with an entry of the higher-level DAT table corresponding to the storage request, and responsive to the validation, updating the higher-level DAT table entry to allow access to the restricted-use portion of the common virtual storage, otherwise, returning a DAT fault for the higher-level DAT table entry.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, address translation of virtual addresses to the real physical address of main memory or storage locations are discussed below.

Some computer operating systems (z/OS, for example) support common virtual storage that is accessible to all address spaces created to run work in the operating system, in addition to, private virtual storage that is accessible only to programs running in a given address space. A primary reason an address space is created by a multi-user operating system is to provide storage separation between work being performed for distinct users of varying privilege. On Z systems, additional protection of storage is provided by the storage key that can be assigned to a page of storage. System authorized programs can assign any storage key from 0-15, unauthorized user programs can only assign a storage key of 8-15 which are known as user storage keys. Storage keys 0-7 are system storage keys and any storage assigned in a system key cannot be modified by unauthorized user programs. Because common virtual storage is accessible to all address spaces, authorized system programs allocate common virtual storage in a system key (0-7) to protect the storage from modification by unauthorized user programs.

In the z/OS operating system, programs that have sufficient system authorization can invoke z/OS operating system interfaces to allocate common virtual storage. Some legacy z/OS software applications obtain common virtual storage to share data and communicate across multiple address spaces that are created on behalf of the software application. In some cases, the common virtual storage is to be modified by unauthorized user programs that are part of the software application that do not have the system authorization of the program that obtained the storage, so the storage is allocated such that it can be modified by these unauthorized user programs. In this case, the common virtual storage is specifically allocated in a user storage key that an unauthorized user program has the ability to modify. This is known as user-key common virtual storage.

Challenges with using user-key common virtual storage include not only modifications by the unauthorized user programs of the software application, but by all other unauthorized user programs that are not part of the software application. This could, for example, involve other unauthorized user programs running in the operating system on behalf of users of less trust or privilege than the programs of the software application. This puts this storage at greater risk of intentional or even unintentional modification by unauthorized user programs that are not intended to have access to the storage, thus the reliability and security of the data in this storage are at far greater risk of compromise.

Because some of the software applications that employ user-key common virtual storage are legacy software that were created 40 or more years ago, the knowledge of and the source code for the software applications may no longer exist. Therefore it may be very difficult to change the software applications to no longer require user-key common virtual storage and eliminate the risk of compromise of these software applications.

The techniques that are described herein address the risks of using user-key common virtual storage while at the same time not requiring any changes to the software applications that are using the storage.

Turning now to an overview of the aspects of the invention, one or more embodiments of the invention address the above-described shortcomings of the prior art by providing a technique that disconnects the segment table entries from page tables for the common virtual storage area. In addition, a technique to monitor programs that access and attempt to access the common virtual storage area is provided. Provided are mechanisms for a transparent technique in the operating system for the use of user-key common virtual storage that eliminates the risk of compromising of the storage without requiring changes in the software itself that is using the storage. This will be accomplished by having the operating system convert user-key common virtual storage that currently would be commonly accessible to all address spaces to storage that is only commonly accessible to select address spaces.

The advantage of this invention over the known solutions is that the software applications do not have to be re-written to exploit the proposed solution. The other solutions require the software applications to be changed to employ the other solutions. The above-described aspects of the invention address the shortcomings of the prior art by having the O/S convert user-key common virtual storage (currently would be commonly accessible to all address spaces) to storage that is only commonly accessible to select address spaces.

When a request to obtain user-key common virtual storage is performed, the operating system establishes ownership of the user-key common virtual storage based on the user credential of the obtaining address space.

When the common virtual storage is allocated the real storage manager virtualizes the obtained storage pages such that all address spaces have access to the storage. This is accomplished by a common set of page tables that every address space's segment table points to initially when the address space is created. The address space can be associated with the amount of memory/storage allocated for all possible addresses for a computational entity, such as a device, a file, a server, or a networked computer. Address space may refer to a range of either physical or virtual addresses accessible to a processor or reserved for a process.

For common virtual storage, segment fault handling determines the access to the virtual storage because the segment table of each address space points to the common page table, and therefore, segment fault processing will not occur.

The techniques described herein only allow the address spaces that have the same user credentials or that have an associated user credential as the obtaining address space will be given access to the restricted-use common virtual storage by the real storage manager at the time of the storage access process.

All address spaces will have their segment table entries for user-key common storage areas marked as invalid, so that they do not have access to the storage. Any later reference to this storage within these address spaces will now drive a segment fault process which will determine if the address space should be given access to the storage based on its user credentials.

If a program running in an address space that is not connected to the user-key common virtual storage attempts to connect to the user-key common storage, a segment fault process in the real storage manager will obtain control. Segment fault processing will determine the virtual storage page is in user-key common storage and will validate the connecting address space's user credentials.

If the validation succeeds, the fault will be resolved and the connecting address space will be given access to the storage. In this case, the segment table of the address space attempting access to the user-key common storage will be updated to indicate the storage is valid and will also be updated to point to the associated user-key common virtual page table. If the validation fails, the segment fault will not resolve successfully and the accessing address space will take an error on the segment fault.

Figure 1:
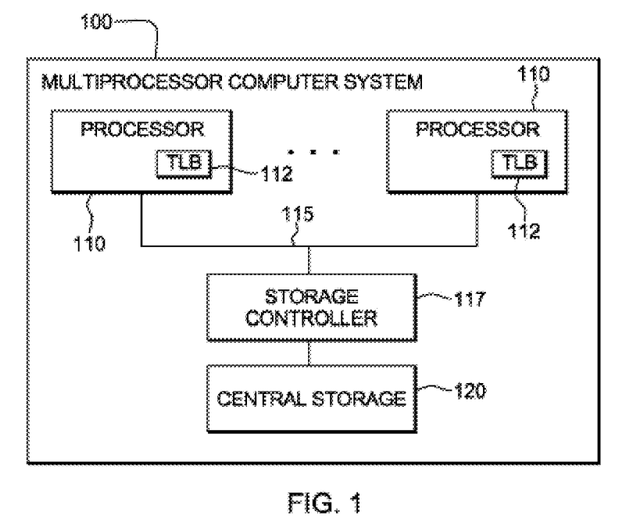
FIG. 1 depicts a computer system for practicing the teachings described herein.
Figure 2:
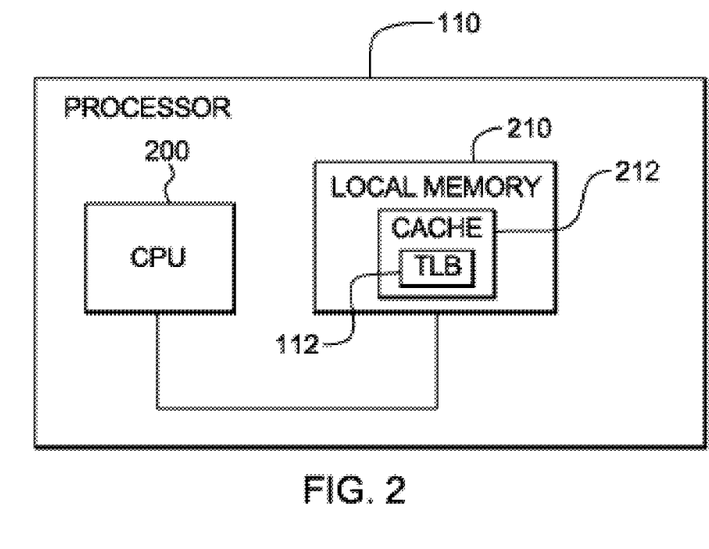
FIG. 2 depicts a process for practicing the teaching described herein.

Turning now to a more detailed description of aspects of the present invention, FIG. 1 depicts a multiprocessor system 100 according to embodiments of the invention. As one example, multiprocessor computer system 100 includes multiple processors, coupled together, and to a central storage 120, via one or more busses 115 and a storage controller 117. As shown in FIG. 2, each processor 110 includes a central processing unit (CPU) 200 and local memory 210, coupled to one another via, for example, one or more buses or other connections. In this example, local memory 210 includes (or is) a cache 212. To facilitate memory access, some architectures use a translation lookaside buffer (TLB) 112 to store addresses that have been translated. In accordance with this invention, TLB 112 may contain one or more storage keys for storage protection checking and reference and change bit recording for CPU storage accesses. The storage keys held in TLB 112 of local processor cache are referred to as the TLB keys, while the storage keys held in central storage 120 are referred to herein as the page keys.

Figure 3:
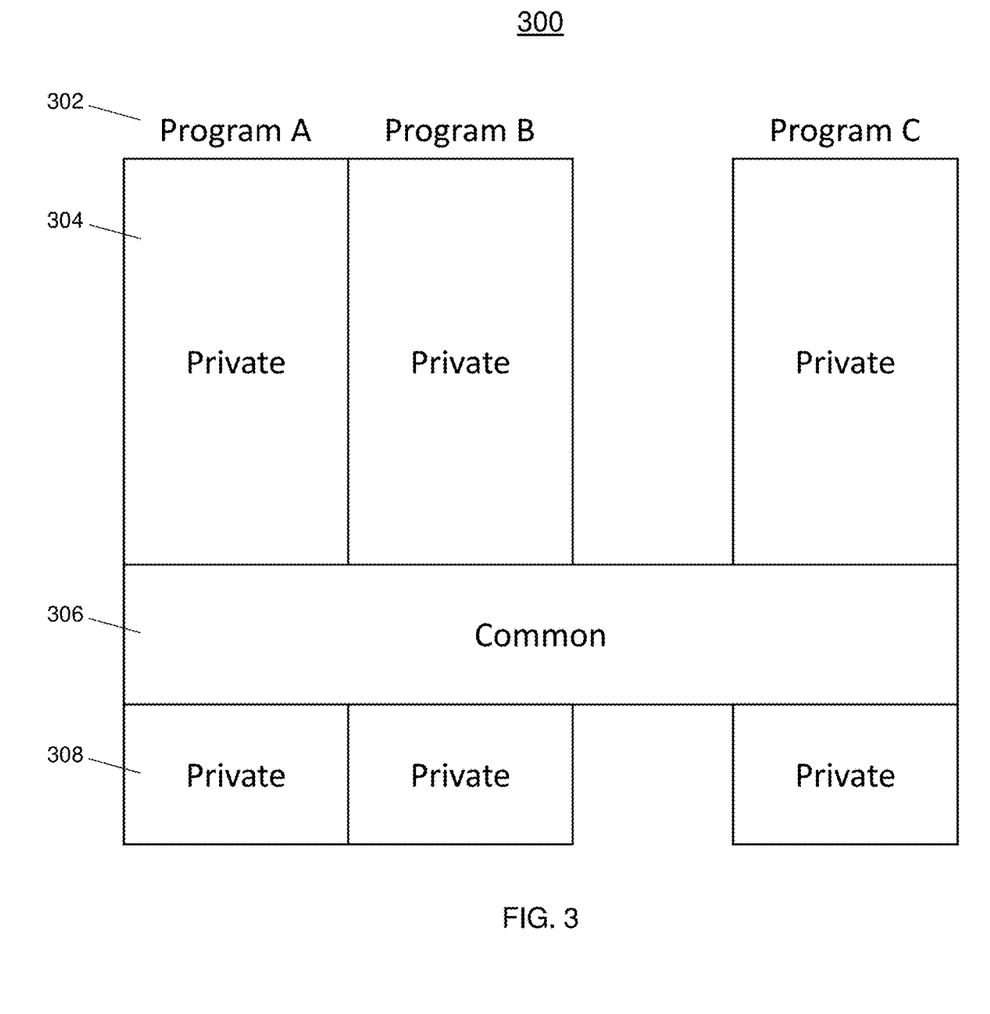
FIG. 3 depicts an example of a virtual address space layout.

Now referring to FIG. 3, a virtual address space 300 for various programs/processes/users is shown. In this non-limiting example, three programs 302 including Program A, Program B, and Program C are shown. Each program runs its own virtual address space which has access to its own private storage 304, 308 as well as common virtual storage 306. The private storage areas 304, 308 are used by the associated program(s). For example, the private storage area 304, 308 are reserved for Program A. In addition, Program B and Program C have their own respective private storage areas 304, 308. The common virtual storage 306 is generally available to all address spaces. As shown in FIG. 3, the common virtual storage 306 spans the address spaces of Program A, Program B, and Program C. The techniques described herein provide for converting the user-key common virtual storage 306 that allows access for all address spaces to a storage that is commonly accessible to select address spaces. In other words, the common virtual storage will include areas of storage that are non-restricted and restricted use areas.

Figure 4:
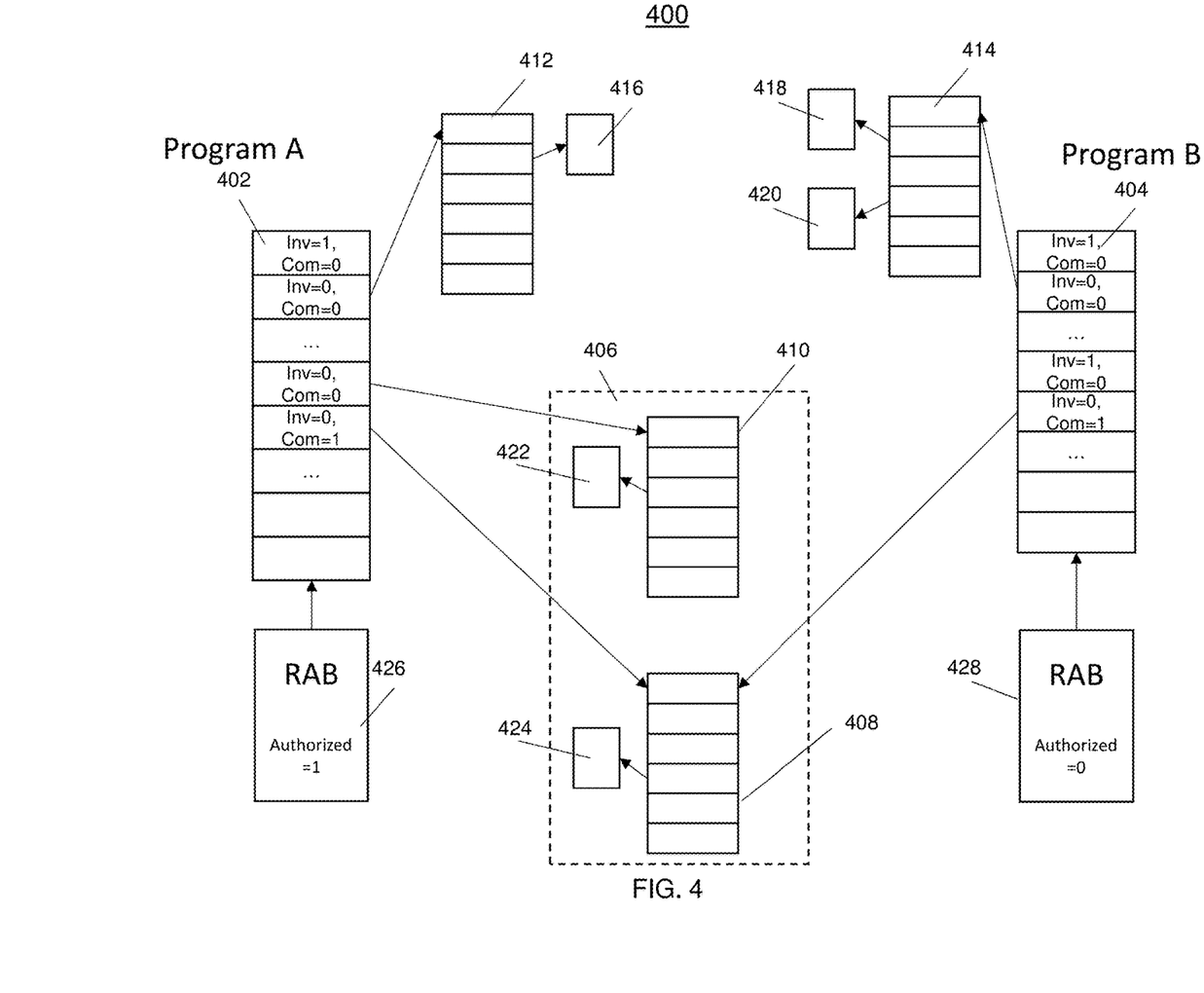
FIG. 4 depicts an example data address translation (DAT) structure in accordance with one or more embodiments of the invention.

Now referring to FIG. 4, a data structure 400 for performing dynamic address translations is used to convert the virtual addresses into real storage addresses to access data in memory/storage. In this non-limiting example, Program A is shown having a segment table 402 and Program B is shown having a segment table 404. The segment tables 402, 404 can be located based on the current address space with the received virtual address where the segment tables 402, 404 can contain an entry for each virtual address range. Each entry of the segment tables 402, 404 include various data including segment information, invalid bit "Inv" and common bit "Com." The Com bit is used to indicate that the segment table entry is connected to the common virtual storage and the Inv bit is used to indicate whether the entry is valid. Each entry of the segment table 402, 404 also includes a pointer to a page table associated with segment table entry.

When the Inv bit is set to "0" the hardware is capable of translating the virtual address to the real address. When the Inv bit is set to "1", the segment is invalid and the hardware cannot translate an address from a virtual address to its real physical address in storage/memory. Any attempted access to the address results in a fault which can be recorded. The fault information can include information of the requesting user (e.g., an application) and the requested storage information.

Segment table entries that are directed to private storage 412, 414 always has the Com bit is OFF (Com=0). When the Com bit is ON (Com=1), the storage controller can rely on every address space always pointing to the same page table for that segment. Common segments save space in the translation look-aside buffer (TLB) because they are known to always resolve to the same real addresses.

The common virtual storage 406 can be divided into a restricted-use storage area 410 and a non-restricted use storage area 408. The segment table entries that are linked to the non-restricted user storage area 408 have their Com bit ON and points to the common page table(s). The segment table entries that are linked to the restricted-use area 410 has their Com bit OFF and may not be valid in all address spaces.

An entry in the segment tables 402, 404 can point to page tables 408, 410, 412, and 414. As shown in FIG. 4, the page table can include a common virtual storage area 406 and a private area 412, 414. A page table that is private to the program can only be accessed by the program, such as Program A in this example. For example, Program A includes a private storage page table 412 and Program B includes a private storage page table 414.

The segments that are connected to page tables of the common virtual storage for non-restricted use have the Com bit ON and point to the common page tables. The segments that are connected to page tables for the restricted-use area of the common virtual storage have the common segment bit OFF and may not be valid in all address spaces.

As shown in FIG. 4, the entries in the segment table 402, 404 having the Inv bit On, cannot be mapped to a real address and do not include a pointer to any page tables. It should be understood that tables that point to the segment tables are called region tables. In some embodiments of the invention, the region table entries point to common segment tables. If common segment tables are used, then a region fault can be used to indicate and perform verification. Even further, region tables can also include various levels of region tables. For example, in the z Architecture includes three different levels and therefore, a shared region table is used. In another embodiment, if pages are common page tables with private page tables, the page tables themselves can include a common page bit if supported by the architecture.

The page tables a plurality of entries that can include various information including address information, indicator bits, and flags. In addition, each entry includes a pointer (e.g., a real address) to a data page, such as the data pages 416, 418, 420, 422, and 424 of the corresponding segment entries. FIG. 4 also includes a resource address blocks (RAB) 426, 428 which can provide an indication of user credentials, permissions that are allowed for each program, user, or application. Also, as shown in FIG. 4, the RABs 426, 428 can include pointers to the segment table 402, and 404.

The techniques described herein improve over the prior art by not automatically connecting the segment tables to the restricted-use portion of the common virtual storage paging tables. The Com bit and Inv bit are processed by a fault handling process described below and if it is determined that the user credential is valid, the Com bit and Inv bit are updated allowing access to the address space as described below.

Figure 5:
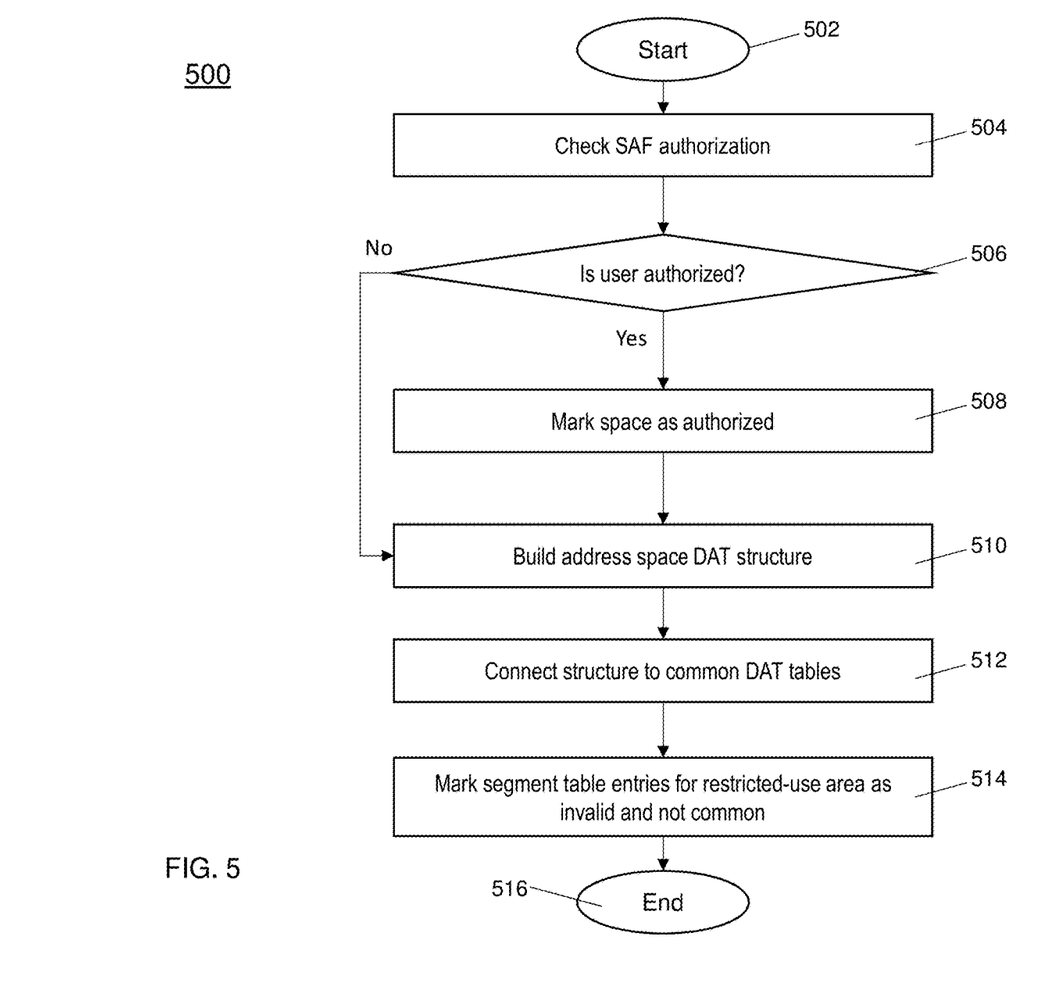
FIG. 5 depicts a create process flow in accordance with one or more embodiments of the invention.

Now referring to FIG. 5, a create address space process 500 is shown in accordance with one or more embodiments of the invention. The create address space process 500 begins at block 502 and continues to block 504 which provides for checking the security access facility (SAF) authorization (SAF not shown). Responsive to receiving a request, a processor communicates with the SAF to determine if the address spaces have the same user credentials or have an associated user credential as the obtaining address space to give allow access. A value associated with the user credential and address space is compared with a user credential value and address space stored in the SAF to determine if authorization is allowed. In some embodiments, the SAF can be checked at different times during processing. For example, when a new request or task is started within the same address space, the SAF can be checked.

At decision block 506, if the user or process is determined to be authorized ("Yes" branch) the process 500 continues to block 508 which marks an address space as authorized for the user that is allowed. Subsequently, the process 500 proceeds to block 510 to build an address space data address translation structure such as that shown in FIG. 4.

If at decision block 506, the user or process is determined to not be authorized ("No" branch) after checking the SAF, the process 500 then proceeds to block 510 to build the appropriate DAT structure. That is, the segment table entries for the address space are not marked as authorized.

Block 512 connects the DAT structure to common DAT tables. The DAT structure is connected by setting one or more bits in the segment table entries. For example, the segment table entry is connected to the common DAT page tables by setting the common bit ("Com"="1"). The segment table entry points to the non-restricted use portion of the common virtual storage.

At block 514, the process 500 marks the segment table entries for the restricted-use area of a common storage as invalid and not common (Inv=1; Com=0). Therefore, a subsequent access to the address space will drive a fault handling process and can be updated as needed.

The create address space process 500 ends at block 516. By having the O/S disconnect the DAT structure from the user-key common virtual storage, the risk of compromising the storage from other processes or users without appropriate privilege and/or trust levels accessing the restricted-use area of common virtual storage.

Figure 6:
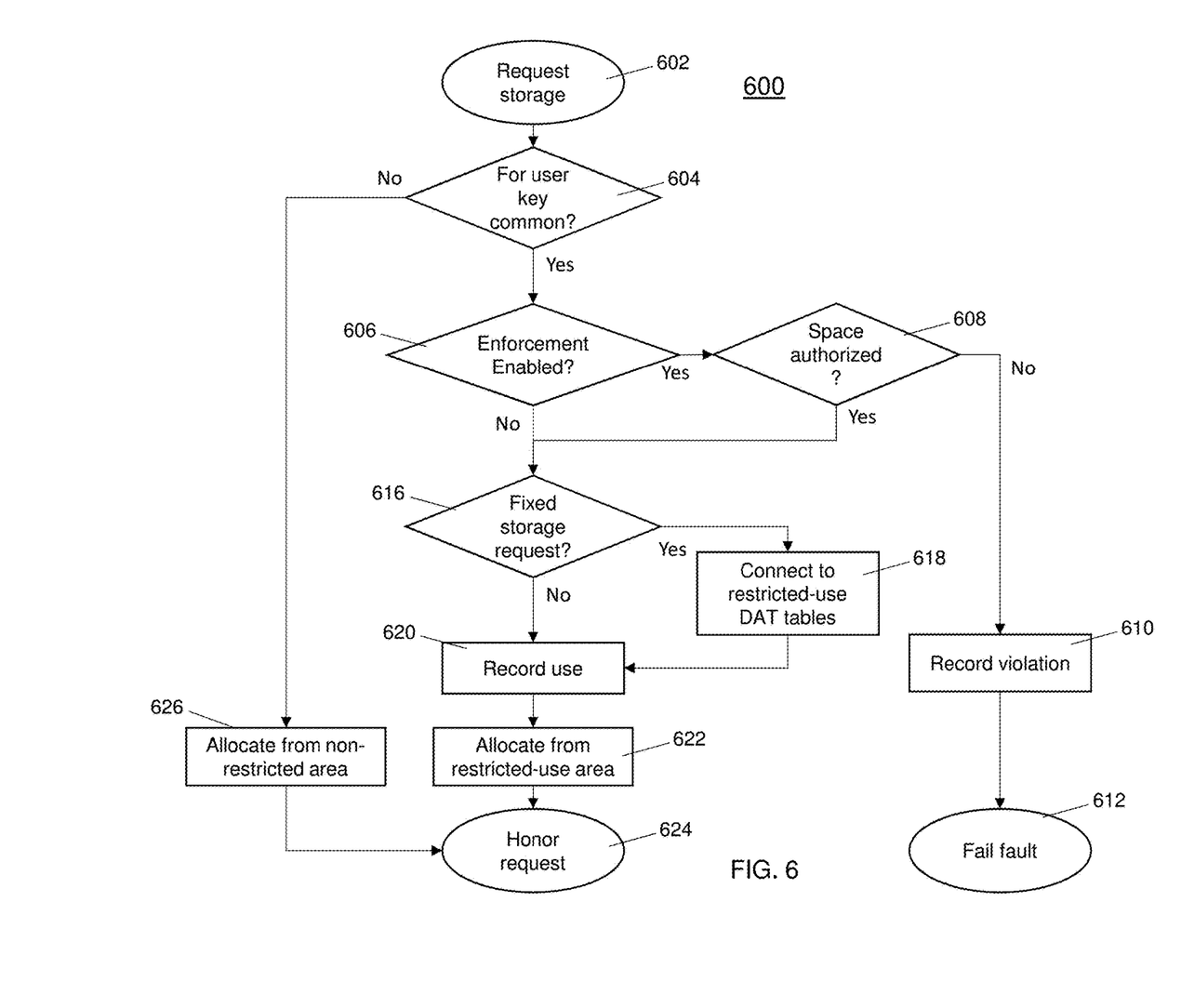
FIG. 6 depicts an obtain storage process flow in accordance with one or more embodiments of the invention.

Now referring to FIG. 6, storage obtain process 600 is shown in accordance with one or more embodiments of the invention. The process 600 receives a storage request at block 602 where the request is associated with a particular address (address space) and proceeds to decision block 604 to determine if the storage request is for user-key common storage. If so ("Yes" branch), the process 600 continues to the decision block 606 to determine whether enforcement is enabled. Enforcement refers to the function that enforces user key common storage's best practice. When this function is active, the 'SAF authorization enforcement is also performed. On z/OS systems, the system programmer (such as a system administrator) can enable certain functions that can control 'best practices' for a system. The best practice as it pertains to user key common storage is not to allow the creation of such unrestricted storage. The function can also ignore best practices for systems with programs that currently violate those practices until such time that the system complies with them. In one or more embodiments of the invention, an installation may choose to disable enforcement in order to audit usage without disrupting operations of the system until they are confident all the right address spaces are authorized. If enforcement is enabled ("Yes" branch), the process 600 proceeds to decision block 608 to determine whether the address space is authorized. If the address space is not authorized ("No" branch) then the process 600 proceeds to block 610 to record the violation and block 612 to indicate a failing fault.

Referring back to the decision block 606, if the enforcement is not enabled ("No" branch), the process 600 proceeds to block 616 to determine if the request is a fixed storage request. If at decision block 608 the space is authorized ("Yes"), the process 600 proceeds to decision 616 to determine if the request is fixed storage request. If so ("Yes" branch), at block 618 the process 600 connects to the restricted-use DAT tables and proceeds to block 620 to record the use. If not ("No" branch), the process 600 records the use at block 620 without connecting the restricted-use DAT table.

Next, the process 600 continues to block 622 and the storage manager allocates storage from the restricted-use area and allows the request at block 624. Returning to the decision block 604, if the storage request is not for user-key common storage ("No" branch), the process 600 continues to block 626 and allocates storage from the non-restricted storage area and allows the request at block 624.

Figure 7:
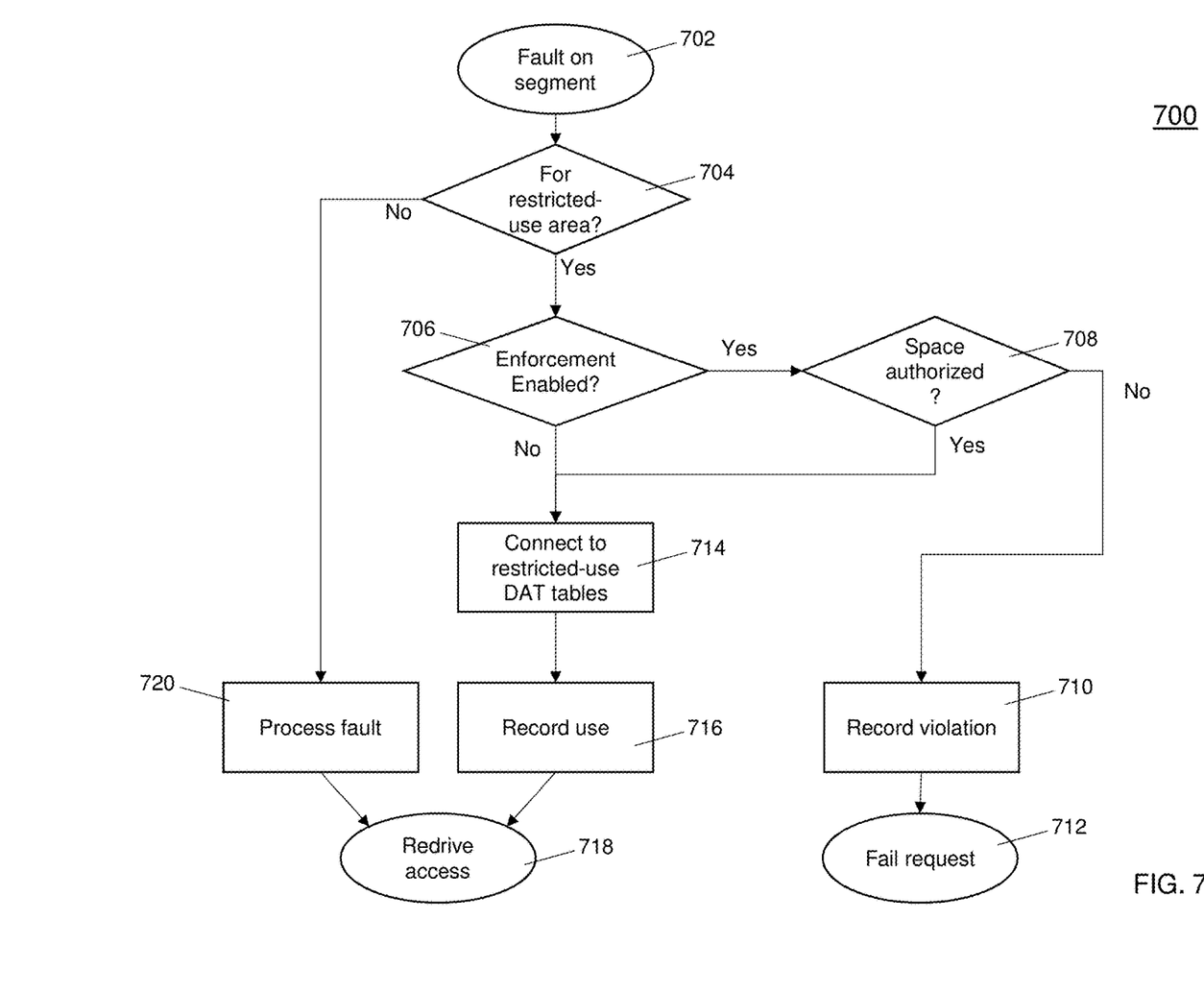
FIG. 7 depicts a segment fault process flow in accordance with one or more embodiments of the invention.

Now referring to FIG. 7, segment fault process 700 is shown in accordance with one or more embodiments of the invention. The process 700 determines that a fault on a segment has occurred and proceeds to decision block 704 which determines whether the segment fault occurred for a restricted-use storage area.

At decision block 704, if it is determined that the fault occurred for the restricted-use storage area ("Yes" branch), additional checks are performed. The process 700 continues to decision block 706 to determine if enforcement is enabled. If so ("Yes" branch), the process continues to decision block 708 to determine if the space is authorized. If the space is not authorized ("No" branch), the process 700 proceeds to block 710 and records the violation. The request fails at block 712.

If at decision block 708 the space is authorized ("Yes" branch), the process 700 continues to block 714 and connects to the restricted-use DAT tables.

Also, if the enforcement is not enabled at decision block 706 ("No" branch), the process 700 continues to block 714. The use recorded at block 716 and the system re-drives access at block 716.

If at decision block 704, if it is determined the fault does not occur for a restricted user area ("No" branch), the process 700 continues to block 720 to process the fault and at block 718 the system re-drives access.

Figure 8:
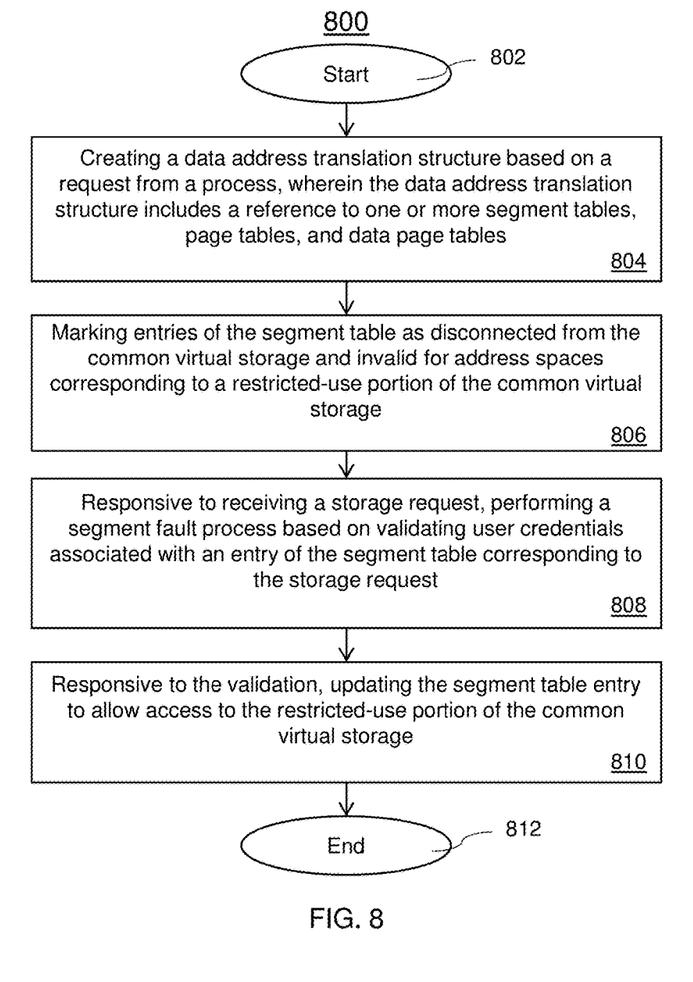
FIG. 8 depicts a flowchart of a method in accordance with one or more embodiments of the invention.

Now referring to FIG. 8, a flowchart of a method 800 for implementing a transparent conversion for a common virtual storage in accordance with one or more embodiments of the invention. The method 800 begins at block 802 and proceeds to block 804 which provides for creating, by a storage manager, a data address translation structure based on a request from a process, wherein the data address translation structure includes a reference to one or more segment tables, page tables, and data page tables. Block 806 provides for marking entries of the segment table as disconnected from the common virtual storage and invalid for address spaces corresponding to a restricted-use portion of the common virtual storage. At block 808, the method provides responsive to receiving a storage request, performing a segment fault process based on validating user credentials associated with an entry of the segment table corresponding to the storage request, and proceeds to block 810 which provides responsive to the validation, updating the segment table entry to allow access to the restricted-use portion of the common virtual storage, or otherwise, returning a segment fault for the segment table entry. The method 800 ends at block 812.

Figure 9:
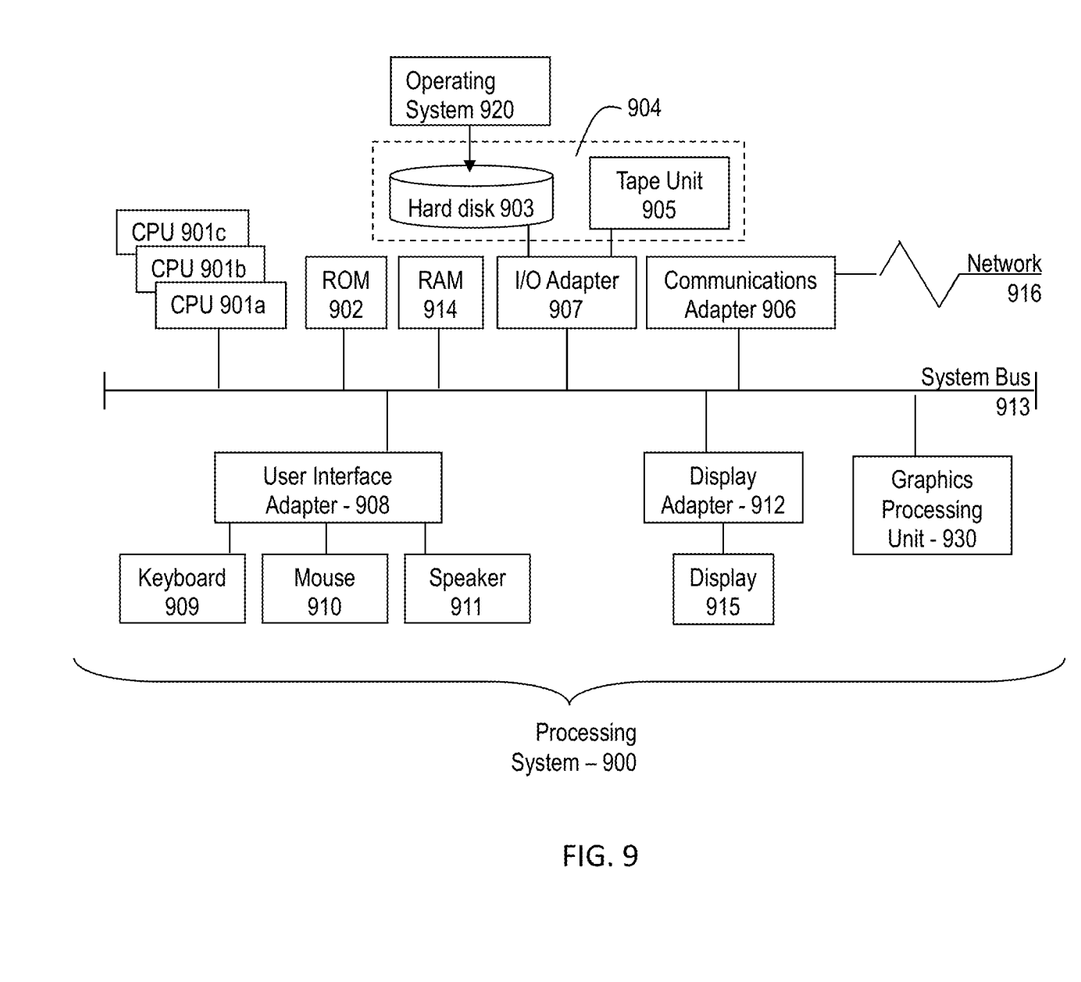
FIG. 9 depicts a system for practicing the teachings described herein.

Referring to FIG. 9, there is shown an embodiment of a processing system 900 for implementing the teachings herein. In this embodiment, the system 900 has one or more central processing units (processors) 901a, 901b, 901c, etc. (collectively or generically referred to as processor(s) 901). In one embodiment, each processor 901 may include a reduced instruction set computer (RISC) microprocessor. Processors 901 are coupled to system memory 914 and various other components via a system bus 913. Read only memory (ROM) 902 is coupled to the system bus 913 and may include a basic input/output system (BIOS), which controls certain basic functions of system 900.

FIG. 9 further depicts an input/output (I/O) adapter 907 and a network adapter 906 coupled to the system bus 913. I/O adapter 907 may be a small computer system interface (SCSI) adapter that communicates with a hard disk 903 and/or tape storage drive 905 or any other similar component. I/O adapter 907, hard disk 903, and tape storage device 905 are collectively referred to herein as mass storage 904. Operating system 920 for execution on the processing system 900 may be stored in mass storage 904. A network adapter 906 interconnects bus 913 with an outside network 916 enabling data processing system 900 to communicate with other such systems. A screen (e.g., a display monitor) 915 is connected to system bus 913 by display adaptor 912, which may include a graphics adapter to improve the performance of graphics intensive applications and a video controller. In one embodiment, adapters 907, 906, and 912 may be connected to one or more I/O busses that are connected to system bus 913 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 913 via user interface adapter 908 and display adapter 912. A keyboard 909, mouse 910, and speaker 911 all interconnected to bus 913 via user interface adapter 908, which may include, for example, a Super I/O chip integrating multiple device adapters into a single integrated circuit.

In exemplary embodiments, the processing system 900 includes a graphics processing unit 930. Graphics processing unit 930 is a specialized electronic circuit designed to manipulate and alter memory to accelerate the creation of images in a frame buffer intended for output to a display. In general, graphics processing unit 930 is very efficient at manipulating computer graphics and image processing, and has a highly parallel structure that makes it more effective than general-purpose CPUs for algorithms where processing of large blocks of data is done in parallel.

Thus, as configured in FIG. 9, the system 900 includes processing capability in the form of processors 901, storage capability including system memory 914 and mass storage 904, input means such as keyboard 909 and mouse 910, and output capability including speaker 911 and display 915. In one embodiment, a portion of system memory 914 and mass storage 904 collectively store an operating system to coordinate the functions of the various components shown in FIG. 9

Figure 10:
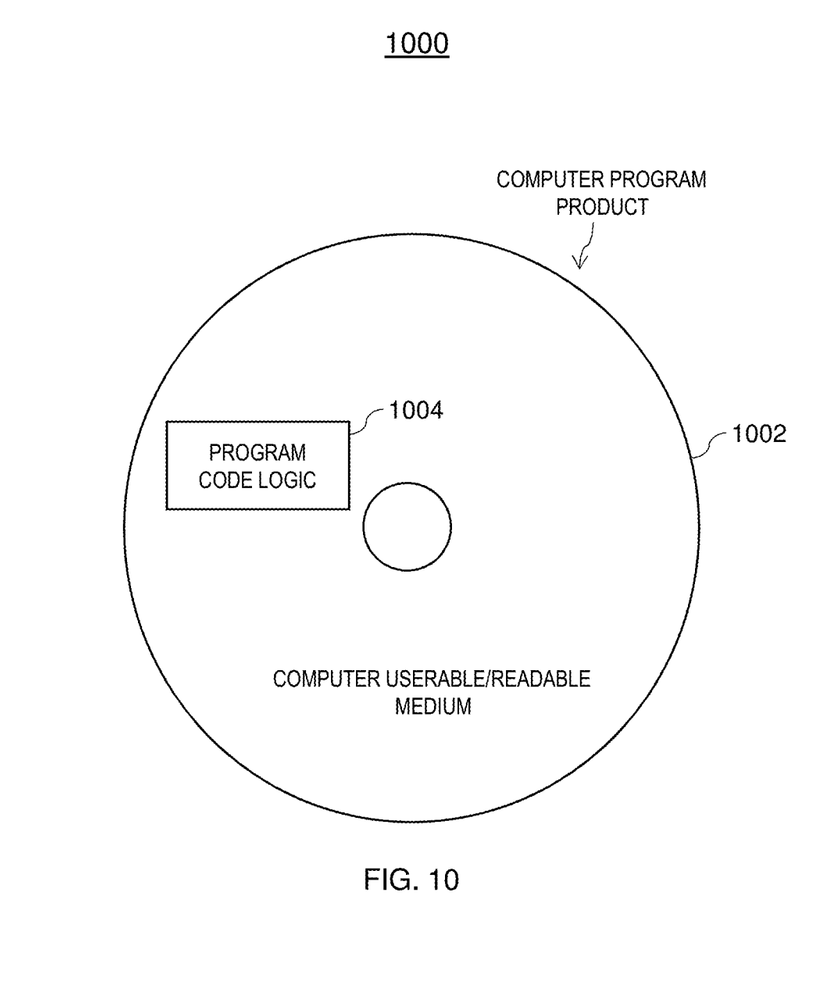
FIG. 10 depicts a computer program product in accordance with one or more embodiments of the invention.

Referring now to FIG. 10, a computer program product 1000 in accordance with an embodiment that includes a computer-readable storage medium 1002 and program instructions 1004 is generally shown.

The technical effects and benefits address the risks of using user-key common virtual storage while allowing existing software applications that are using the storage to operate without requiring an update to the existing software applications.

The segment table for each process does not automatically point to or connect to the restricted-use storage area of the common virtual storage. The pointers or connection is managed using one or more bits for each entry in the segment table. If the segment table entries are automatically connected to the common virtual storage page tables, faults cannot be detected and monitored by the O/S for operating. In one mode, the user access can be tracked and/or restricted based on the user credentials. It is not necessary to restrict access but may just be monitored.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for implementing a transparent conversion of common virtual storage requests to storage with limited access, the computer-implemented method comprising:
    providing a storage manager configured to perform address translation for requests;
    providing a data address translation (DAT) structure configured to connect a higher-level DAT table to a lower-level DAT table, wherein the higher-level DAT table is initially disconnected from a lower-level DAT table associated with a common virtual storage;
    creating, by a storage manager, the DAT structure based on a request from a process, wherein the DAT structure comprises a reference to one or more higher-level DAT tables, lower-level DAT table tables, and data page tables;
    marking entries of the higher-level DAT as disconnected from the common virtual storage and invalid for address spaces corresponding to a restricted-use portion of the common virtual storage;
    responsive to receiving a storage request, performing a DAT fault process based on validating user credentials associated with an entry of the higher-level DAT table corresponding to the storage request;
    and responsive to the validation, updating the higher-level DAT table entry to allow access to the restricted-use portion of the common virtual storage, otherwise, returning a DAT fault for the higher-level DAT table entry.

2. The computer-implemented method of claim 1, wherein predetermined addresses are configured to be connected to the common virtual storage, and
    wherein higher-level DAT tables are segment tables.

3. The computer-implemented method of claim 2, wherein entries of the higher-level DAT table include a common bit indicating a connection to a non-restricted use portion of the common virtual storage and an invalid bit to indicate whether an address of the storage request can be translated by the storage manager.

4. The computer-implemented method of claim 1, wherein updating the higher-level DAT table entry comprises setting the invalid bit to connect the higher-level DAT table entry to the restricted-use portion of the common virtual storage.

5. The computer-implemented method of claim 1, wherein the validation comprises comparing a user credential associated with the storage request to a stored user credential for an address space associated with the storage request; and
    validating the storage request responsive to matching a value of the user credential of the storage request with a value of the user credential of the requested address space;
    otherwise, invalidating the storage request by maintaining the higher-level DAT table entry as not being connected to the restricted-use portion of the common virtual storage.

6. The computer-implemented method of claim 1, wherein the common virtual storage comprises a non-restricted use portion and a restricted-use portion, wherein access to the restricted-use portion is limited to users having valid user credentials allowing access to the restricted use portion.

7. The computer-implemented method of claim 1, further comprising storing DAT fault information including an identifier of the user providing the storage request, process information, and a requested address space information resulting in the DAT fault.

8. A system for implementing a transparent conversion of common virtual storage requests to storage with limited access, the system comprising:
    a storage medium, the storage medium being coupled to a processor;
    the processor configured to:
        provide a data address translation (DAT) structure configured to connect a higher-level DAT table to a lower-level DAT table, wherein the higher-level DAT table is initially disconnected from a lower-level DAT table associated with a common virtual storage;
        create the DAT structure based on a request from a process, wherein the DAT structure comprises a reference to one or more higher-level DAT tables, lower-level DAT tables, and data page tables;
        mark entries of the higher-level DAT table as disconnected from the common virtual storage and invalid for address spaces corresponding to a restricted-use portion of the common virtual storage;
        responsive to receiving a storage request, perform a DAT fault process based on validating user credentials associated with an entry of the higher-level DAT table corresponding to the storage request;
        and responsive to the validation, update the higher-level DAT table entry to allow access to the restricted-use portion of the common virtual storage, otherwise, return a DAT fault for the higher-level DAT table entry.

9. The system method of claim 8, wherein predetermined addresses are configured to be connected to the common virtual storage, and
wherein higher-level DAT tables are segment tables.

10. The system of claim 9, wherein entries of the higher-level DAT table include a common bit indicating a connection to a non-restricted use portion of the common virtual storage and an invalid bit to indicate whether an address of the storage request can be translated by the storage manager.

11. The system method of claim 8, wherein updating the higher-level DAT table entry comprises setting the invalid bit to connect the higher-level DAT table entry to the restricted-use portion of the common virtual storage.

12. The system method of claim 8, wherein the validation comprises the processor further configured to compare a user credential associated with the storage request to a stored user credential for an address space associated with the storage request; and
validate the storage request responsive to matching a value of the user credential of the storage request with a value of the user credential of the requested address space;
otherwise, invalidate the storage request by maintaining the higher-level DAT table entry as not being connected to the restricted-use portion of the common virtual storage.

13. The system method of claim 8, wherein the common virtual storage comprises a non-restricted use portion and a restricted-use portion, wherein access to the restricted-use portion is limited to users having valid user credentials allowing access to the restricted use portion.

14. The system method of claim 8, further comprising the processor further configured to store DAT fault information including an identifier of the user providing the storage request, process information, and a requested address space information resulting in the DAT fault.

15. A computer program product for implementing a transparent conversion of common virtual storage requests to storage with limited access, the computer program product comprising a computer-readable storage medium having program instructions embodied therewith, the program instructions executable by a processor to cause the processor to:
provide a data address translation (DAT) structure configured to connect a higher-level DAT table to a lower-level DAT table, wherein the higher-level DAT table is initially disconnected from a lower-level DAT table associated with a common virtual storage;
create the DAT structure based on a request from a process, wherein the DAT structure comprises a reference to one or more higher-level DAT tables, lower-level DAT tables, and data page tables;
mark entries of the higher-level DAT table as disconnected from the common virtual storage and invalid for address spaces corresponding to a restricted-use portion of the common virtual storage;
responsive to receiving a storage request, perform a DAT fault process based on validating user credentials associated with an entry of the higher-level DAT table corresponding to the storage request;
and responsive to the validation, update the higher-level DAT table entry to allow access to the restricted-use portion of the common virtual storage, otherwise, return a DAT fault for the higher-level DAT table entry.

16. The computer program product of claim 15, wherein entries of the higher-level DAT table include a common bit indicating a connection to a non-restricted use portion of the common virtual storage and an invalid bit to indicate whether an address of the storage request can be translated by the storage manager, wherein higher-level DAT tables are segment tables.

17. The computer program product of claim 16, wherein updating the higher-level DAT table entry comprises instructions that are further executable by the processor to cause the processor to set the invalid bit to connect the higher-level DAT table entry to the restricted-use portion of the common virtual storage.

18. The computer program product of claim 15, wherein the validation comprises instructions that are further executable by the processor to cause the processor to compare a user credential associated with the storage request to a stored user credential for an address space associated with the storage request; and
validate the storage request responsive to matching a value of the user credential of the storage request with a value of the user credential of the requested address space;
otherwise, invalidate the storage request by maintaining the higher-level DAT table entry as not being connected to the restricted-use portion of the common virtual storage.

19. The computer program product of claim 15, wherein the common virtual storage comprises a non-restricted use portion and a restricted-use portion, wherein access to the restricted-use portion is limited to users having valid user credentials allowing access to the restricted use portion.

20. The computer program product of claim 15, wherein the instructions are further executable by the processor to cause the processor to store DAT fault information including an identifier of the user providing the storage request, process information, and a requested address space information resulting in the fault.

* * * * *